United States Patent [19]
Gunter et al.

[11] Patent Number: 5,726,815
[45] Date of Patent: Mar. 10, 1998

[54] APPARATUS FOR ALIGNING THE OBJECT FOCUS IN FILAMENT IRRADIATING UNITS

[75] Inventors: John B. Gunter, Catonsville; Daniel V. Ensz, Lutherville; Thomas E. Plovock, Germantown, all of Md.; Derek S. Matheson, Washington, D.C.

[73] Assignee: Fusion UV Systems, Inc., Gaithersburg, Md.

[21] Appl. No.: 631,004

[22] Filed: Apr. 12, 1996

[51] Int. Cl.⁶ .............................. G02B 7/182; F16B 7/06; F21V 21/26
[52] U.S. Cl. .............. 359/872; 359/896; 362/32; 362/238; 362/250; 362/273; 403/43; 403/53; 250/492.1; 250/494.1; 118/50.1; 118/620
[58] Field of Search .............. 359/25, 849, 846, 359/872, 896; 362/32, 238, 239, 250, 273; 250/492.1, 494.1, 504 R; 118/50.1, 620; 403/43, 52, 53, 59, 62, 63

[56] References Cited

U.S. PATENT DOCUMENTS

| Number | Date | Inventor | Ref |
|---|---|---|---|
| 3,015,990 | 1/1962 | Jonkers | 359/846 |
| 4,042,850 | 8/1977 | Ury et al. | |
| 4,099,837 | 7/1978 | Vazirani | |
| 4,115,087 | 9/1978 | Martin | |
| 4,324,575 | 4/1982 | Levy | |
| 4,359,668 | 11/1982 | Ury | |
| 4,514,037 | 4/1985 | Bishop et al. | |
| 4,591,724 | 5/1986 | Fuse et al. | |
| 4,596,935 | 6/1986 | Lumpp | |
| 4,655,563 | 4/1987 | Plante et al. | 359/849 |
| 4,685,762 | 8/1987 | Bjornberg | |
| 4,710,638 | 12/1987 | Wood | |
| 4,712,014 | 12/1987 | Eich | |
| 4,763,991 | 8/1988 | Klotz, Jr. | 359/872 |
| 4,770,898 | 9/1988 | Sugai et al. | |
| 4,831,252 | 5/1989 | Ihnat et al. | |
| 4,831,268 | 5/1989 | Fisch et al. | |
| 4,849,640 | 7/1989 | Kruishoop | |
| 4,962,310 | 10/1990 | Hennecke et al. | |
| 5,092,264 | 3/1992 | Overton et al. | |
| 5,298,759 | 3/1994 | Brewer et al. | |
| 5,418,369 | 5/1995 | Moore et al. | |
| 5,461,515 | 10/1995 | Sorce | 359/872 |

Primary Examiner—Ricky D. Shafer
Attorney, Agent, or Firm—Shlesinger Arkwright & Garvey

[57] ABSTRACT

An apparatus for aligning the object focus of an elliptical reflector, such as positioned within the filament tube of a filament irradiating unit, with a directional axis, such as the centerline of the filament as it travels through the tube. The apparatus includes a support assembly for mounting the tube in a precisely fixed position, and three adjustable mounting assemblies connected to the support assembly at three spaced apart connection points for mounting the support assembly on a stationary base. Each of the mounting assemblies includes a pair of linkages each of adjustable length and forming two sides of a triangle with its apex at the point of connection to the support assembly. Each connection point is at the apex of an imaginary triangle such that adjustment of the mounting assemblies provides both lateral and tilting movements of the support assembly relative to the stationary base, and the central tube axis may be easily tilted, as well as moved laterally, into coincidence with the directional axis from multiple directions.

20 Claims, 8 Drawing Sheets

APPARATUS FOR ALIGNING THE OBJECT FOCUS IN FILAMENT IRRADIATING UNITS

FIELD OF THE INVENTION

This invention relates to apparatus for radiating continuous filaments, and more particularly to apparatus for adjustably mounting ultraviolet lamp units arranged to irradiate a continuous filament or wire-like element, such as an optical fiber having a radiation curable coating, as it passes through a transparent tube.

BACKGROUND OF THE INVENTION

Optical fibers, such as used to transmit light in telecommunications and various other applications, typically are coated with one or more polymeric layers which are designed to protect the optical fibers from moisture and abrasion, to reduce microbending losses, and to allow easier handling of the fiber.

In a typical method of coating an optical fiber, a liquid photocurable polymeric material is applied to the surface of a vertically or horizontally extending and continuously moving filament of the fiber. The resulting coating is then cured by irradiating the coated continuous filament with radiant energy, such as ultraviolet rays. Compositions which are useful as coatings, methods of applying the coatings and methods for curing the coatings, as by the use of ultraviolet radiation, are well known in the art. Some of these are described, for example, in U.S. Pat. No. 4,099,837 to Vazirani, U.S. Pat. No. 4,115,087 to Martin, U.S. Pat. No. 4,324,575 to Levy, and to U.S. Pat. No. 4,514,037 to Bishop et al, the entire contents of each of these patents being expressly incorporated herein by reference.

Apparatus for treating such coated continuous filaments with concentrated radiant energy may comprise a source of the radiant energy and reflectors which are adapted to concentrate the light rays emitted from the source onto the moving filament. One such prior art apparatus comprises primary and secondary reflectors, which together form an elongated elliptical reflector providing an elliptical reflective surface providing a first, or source focus, and a second, or object focus. An elongated light source is positioned to extend along the first focus and the filament to be treated is positioned to travel along the second focus.

Figures 1, 2, 3:
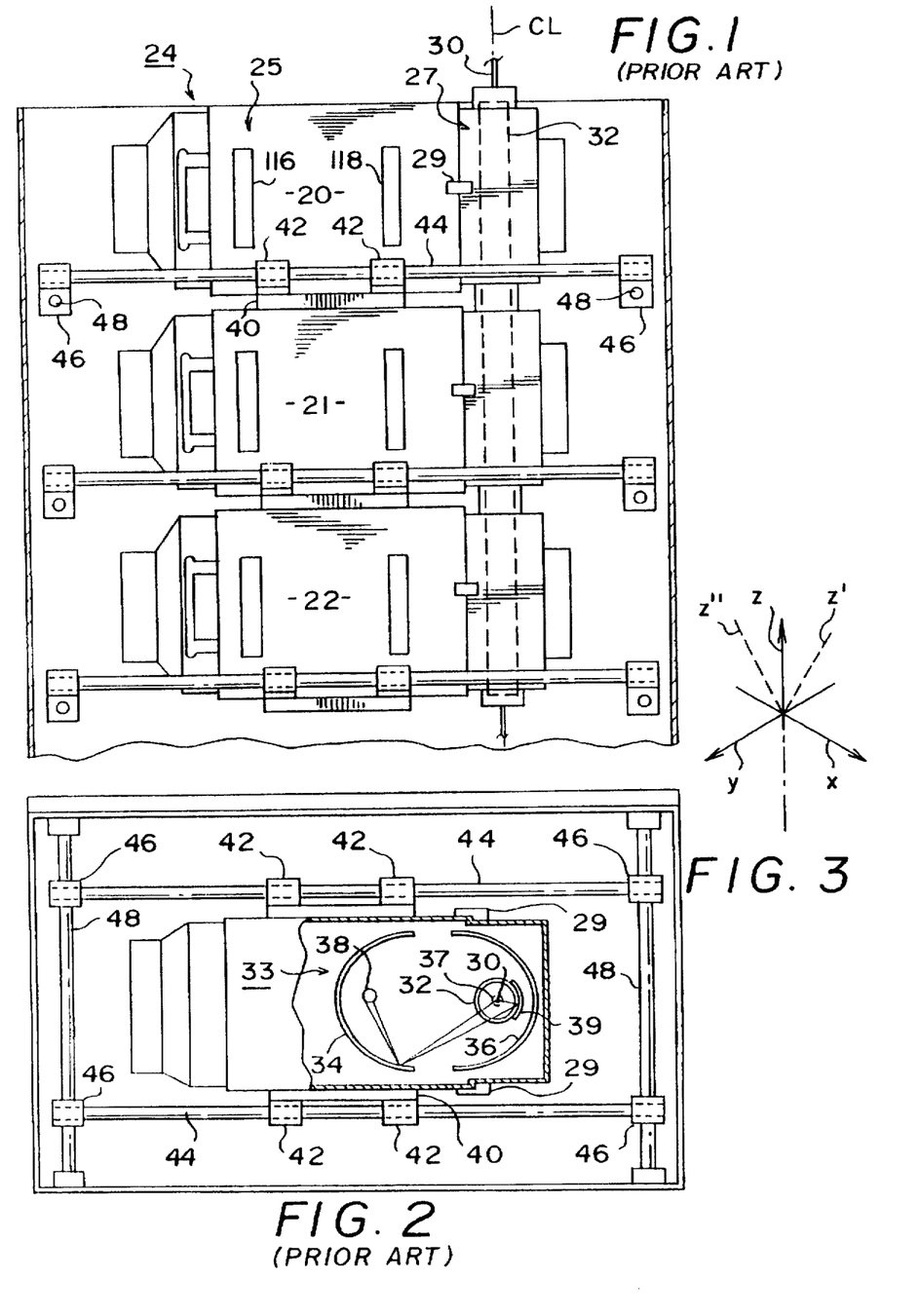
FIG. 1 is an elevational front view of a prior art assembly for mounting and aligning a bank of filament irradiating units.
FIG. 2 is a plan view as seen from above the prior art assembly of FIG. 1.
FIG. 3 is a diagrammatic illustration showing the three adjustment axes X, Y and Z, and a tilting of the vertical axis Z.

A third reflector, such as auxiliary reflector 39 in FIG. 2, also has a concave reflecting surface and may be positioned near the object focus with its concave reflecting surface facing toward both foci of the elliptical reflector. This auxiliary reflector substantially increases the amount of light reaching the object focus by refocusing light which is emitted at the source focus and would otherwise closely miss the object focus. Such an apparatus is described, for example, in U.S. Pat. No. 4,710,638 to Wood, the entire contents of which are expressly incorporated herein by reference.

The type of filament irradiating arrangement shown in the forgoing patent to Wood may be enclosed in two separate housings that are releasably clamped together to form a complete irradiating unit. Thus, a lamp housing may contain the lamp and a primary part of the reflector and a tube housing may contain a secondary part of the reflector and a transparent quartz tube, the latter surrounding the object focus and providing a protective passage for the continuous filament to be treated.

The light source positioned at the source focus may be an elongated electrodeless discharge lamp for emitting radiant energy in the form of ultraviolet rays. Such electrodeless discharge lamps are energized by microwaves, such that the lamp housing also contains a magnetron and wave guide for providing the microwave energy to energize the lamp. Electrodeless discharge lamps of this type are well-known in the art and different embodiments thereof are described in U.S. Pat. No. 4,042,850 to Ury et al and U.S. Pat. No. 4,359,668 to Ury, the entire contents of said patents also being expressly incorporated herein by reference.

In FIG. 1 of the drawings, there is shown a prior art array of three irradiating units 20, 21 and 22. The cabinet 24 of each of these units comprises a lamp housing 25 and a tube housing 27, which are detachably connected together by external clamping type fasteners 29, 29, one of which is on each side of the cabinet. Also shown is a coated continuous filament 30 which is vertically oriented and passes from an overhead coating device (not shown) down through a transparent quartz irradiating tube 32, which surrounds the object focus of an elliptical reflector 33. Although not required, it is preferable that the center axis of this tube be placed substantially at the object focus of the elliptical reflector 33 as may be seen best in FIG. 2, wherein the elliptical reflector comprises a primary reflector section 34 and a secondary reflector section 36. Therefore, in this specification, the center axis of the irradiating tube is described as being precisely positioned substantially at the object focus of the elliptical reflector. A radiation source 38 is precisely positioned at the source focus of reflector 33.

It is important to recognize here that the effective curing zone or "sweet spot", in which the intensity of the radiation is maximized and is sufficient to effect curing of the fiber coating, may be represented by an imaginary vertical column 37 having a diameter of only about 2.0 millimeters relative to a much greater column height of the order of 34 or more inches. The vertically extending and vertically travelling filament 30 must remain precisely within this curing volume as it travels along the length thereof. It follows that the object focus, as represented by the center axis of the quartz tube 32, must be very precisely aligned with the centerline CL of the continuous filament 30.

FIGS. 1 and 2 further illustrate a prior art assembly for aligning the irradiating units 20, 21 and 22 with the centerline of the continuous filament 30. The alignment assembly shown comprises a carriage 40 for supporting the irradiating unit cabinet 24. Carriage 40 has on each side a pair of arms 42, 42 for slidably engaging and being selectively fixed to a first pair of horizontal rods 44, 44 for providing a horizontal adjustment in the direction of an X-axis. The rods 44 have at each end a mounting sleeve 46 for slidably engaging a second pair of horizontal rods 48, 48 for providing horizontal adjustment in the direction of a Y-axis.

It is to be noted here that adjustments along the vertical Z axis are not critical because this merely changes the level at which the filament 30 first enters the curing zone 37 within the quartz tube 32. Instead, the critical adjustment that cannot be made readily in the prior art structure of FIGS. 1 and 2 is that for correcting a tilt of the Z axis as represented by tilted axes Z' and Z" illustrated in FIG. 3. For example, if the centerline of the quartz tube 32 were to correspond initially to the tilted axis Z', one end of each of the rods 44 and 48 would have to be shimmed in some fashion to move the center axis of quartz tube 32 from the Z'-axis position to the precisely vertical Z-axis position. Such a shimming operation can be quite time consuming and expensive and is almost always necessary after any replacement or maintenance of the irradiating units 20, 21 or 22.

SUMMARY OF THE INVENTION

One object of the invention is therefore to provide a mounting arrangement for one or more filament irradiating units (irradiators) that comprises an alignment assembly for readily and easily aligning the object focus within an irradiating tube with a directional axis defined by the centerline of a continuous filament, both during initial installation of the irradiator(s) and after the occurrence of any maintenance of one or more components of the irradiator(s), such as replacement of the radiation lamp.

Another object of the invention is to provide an alignment assembly for facilitating tilting adjustments of an entire array of one or more irradiators so as to return the object focus within the irradiating tube to a precise vertical position from a tilted position in any direction.

A further object of the invention is to provide a swing plate on which one or more irradiators may be mounted so that the unit(s) may be readily replaced or removed from service for maintenance, and thereafter returned to the same precise operating position from which removed with no or only minimal readjustment of the position of the object focus within the irradiating tube.

It is also an object of the invention to provide a new irradiator mounting system that permits rapid lamp or tube replacement without compromising a prior accurate alignment with the centerline of the continuous filament to be treated, and that provides for readily and accurately aligning an array of one or more irradiators to the filament centerline. One advantage of the mounting system of the invention is that irradiator maintenance or replacement does not compromise the alignment of object focus within the irradiating tube.

These and other objects and advantages are achieved in accordance with the present invention by providing an apparatus for mounting and aligning filament irradiation units, such as ultraviolet irradiators having an electrodeless discharge lamp activated by microwaves and housed in a cabinet having a lamp and primary reflector section and a tube and secondary reflector section. The mounting and alignment apparatus facilitates aligning the object focus, such as represented by the central axis of an irradiating tube, with a directional axis, such as defined by a continuous filament travelling along a vertical axis.

The mounting and alignment apparatus comprises support means for supporting an array of one or more irradiating units on an adjustable support assembly so that the object focus within the irradiating tube of each unit is at a precisely fixed location relative to the adjustable support assembly, and mounting means for adjustably mounting the adjustable support assembly on a stationary base for both lateral and tilting movements. These adjusting movements are such that the object focus within the irradiating tube may be moved into coincidence with the directional axis from any lateral direction and tilt orientation. The mounting means also provides for precisely fixing the position of the adjustable support assembly when the object focus coincides with the directional axis.

To insure accurate alignment between each irradiating unit and the adjustable support, the irradiating unit cabinet includes a rigid and accurately machined rear mounting panel with locating bushings. These bushings allow the installer to fix the irradiating unit to the adjustable support so as to accurately and reproducibly locate the elliptical reflector and tube assembly within the irradiating unit with respect to the centerline of the continuous filament. For example, when the irradiating unit is assembled, the locating bushings in the rear mounting panel are accurately referenced relative to the elliptical reflector and the fixtured reflector supports.

A single irradiator or multiple irradiators may be mounted on a single adjustable support assembly. Thus, the support assembly and the mounting fixtures thereon can be simply scaled to hold multiple irradiators. Mounting multiple irradiators on a single adjustable support assembly substantially reduces the number of alignment operations required when the irradiators are first installed, or removed for service and reinstalled, since the entire array of multiple irradiators can be aligned in a single alignment operation.

Although the adjustable support assembly may consist of a single rigid plate, this assembly preferably comprises three major components, namely, an adjustable frame to which mounting pins are fixed, a plate articulated to the frame by pivot means providing swinging movement of the plate relatively to the frame, and a latch mechanism for releasably fastening the movable edge of the plate to the frame so that the swinging movement may be selectively prevented when the central tube axis is aligned or is to be aligned with the directional axis. An array of multiple irradiators may be mounted on the articulated plate such that the respective positions of their irradiating components may be adjusted simultaneously. This is particularly beneficial when a single filament tube is irradiated by multiple irradiator units.

The swinging movement of the articulated plate allows the array of irradiators to be moved out of its alignment position into a service position for maintenance of the individual irradiating units and/or removal of the irradiating tube for cleaning or replacement. The irradiating units may receive a single irradiating tube, or may contain segments of a composite tube. To insure proper realignment when the articulated plate is returned from its service position to its aligned position for operation of the irradiating units, the support means may further comprise an alignment pin on one of the plate and the frame and an alignment aperture on the other of the plate and the frame. The alignment pin and aperture are respectively positioned such that engagement therebetween insures realignment of the central tube axis with the directional axis of the continuous filament.

As a very slight shifting movement between the articulated plate and the adjustable frame may occur with time and result in binding between the alignment pin and the alignment aperture, the support means may also comprise hinge elements for selectively adjusting by relatively small amounts the position of the plate relative to the frame so as to provide any needed realignment to prevent binding between the alignment pin and the alignment aperture.

The mounting means preferably comprises three mounting assemblies connected to the adjustable support frame at three spaced apart locations each corresponding to one of the mounting assemblies. Preferably each of the mounting locations is at the apex of an imaginary triangle to provide a 3-point contact arrangement that allows unusually fine adjustments in all directions, such that the adjustable frame can be accurately adjusted in the X, Y and Z axes and in the tilting of all of these axes.

Each of the mounting assemblies comprises three mounting pins, a pair of which is fixed to one of the frame and the base and a sole one of which is fixed to the other of the frame and the base. Each pin of the mounting pin pair is connected to the sole mounting pin by a linkage of adjustable length. At each end of this linkage is a pivot joint between the linkage and a corresponding mounting pin. The pair of mounting pins are located so that the two adjustable linkages form two sides of a triangle having its apex at the sole mounting pin.

BRIEF DESCRIPTION OF THE DRAWINGS

The present invention may be further understood by considering the detailed description below in conjunction with the accompanying drawings, in which.

DETAILED DESCRIPTION OF THE INVENTION

FIGS. 1 and 2 of the drawings are discussed in the background section above as illustrating a prior art apparatus for mounting and aligning irradiating units for curing a coating material on a continuous filament. As also previously indicated, FIG. 3 illustrates the three adjustment axes X, Y and Z, and a tilting of the vertical axis Z. The present invention as described below provides for easy adjustments of a similar array of irradiating units in all three of the adjustment axes X, Y and Z, and in the tilting of the vertical axis Z or the tilting of the other two axes X and Y. These adjustments facilitate ready alignment of the central axis of the irradiating tube 32 with a directional axis, such as the axis along which the continuous filament 30 is moving for the purpose of curing a coating on the surface thereof.

Figure 4:
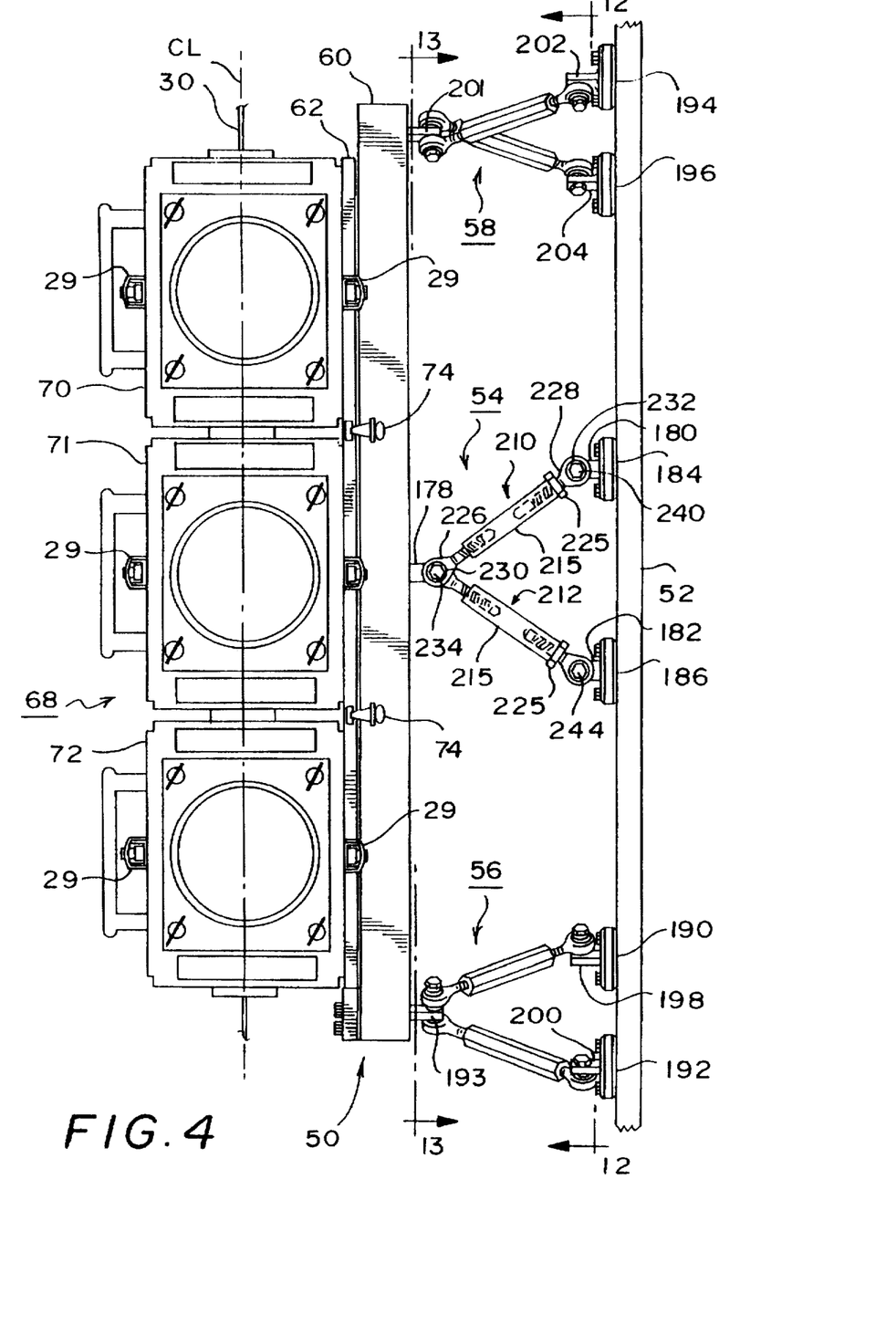
FIG. 4 is a side elevational view of a bank of three filament irradiating units mounted on an alignment assembly according to the invention.
Figure 5:
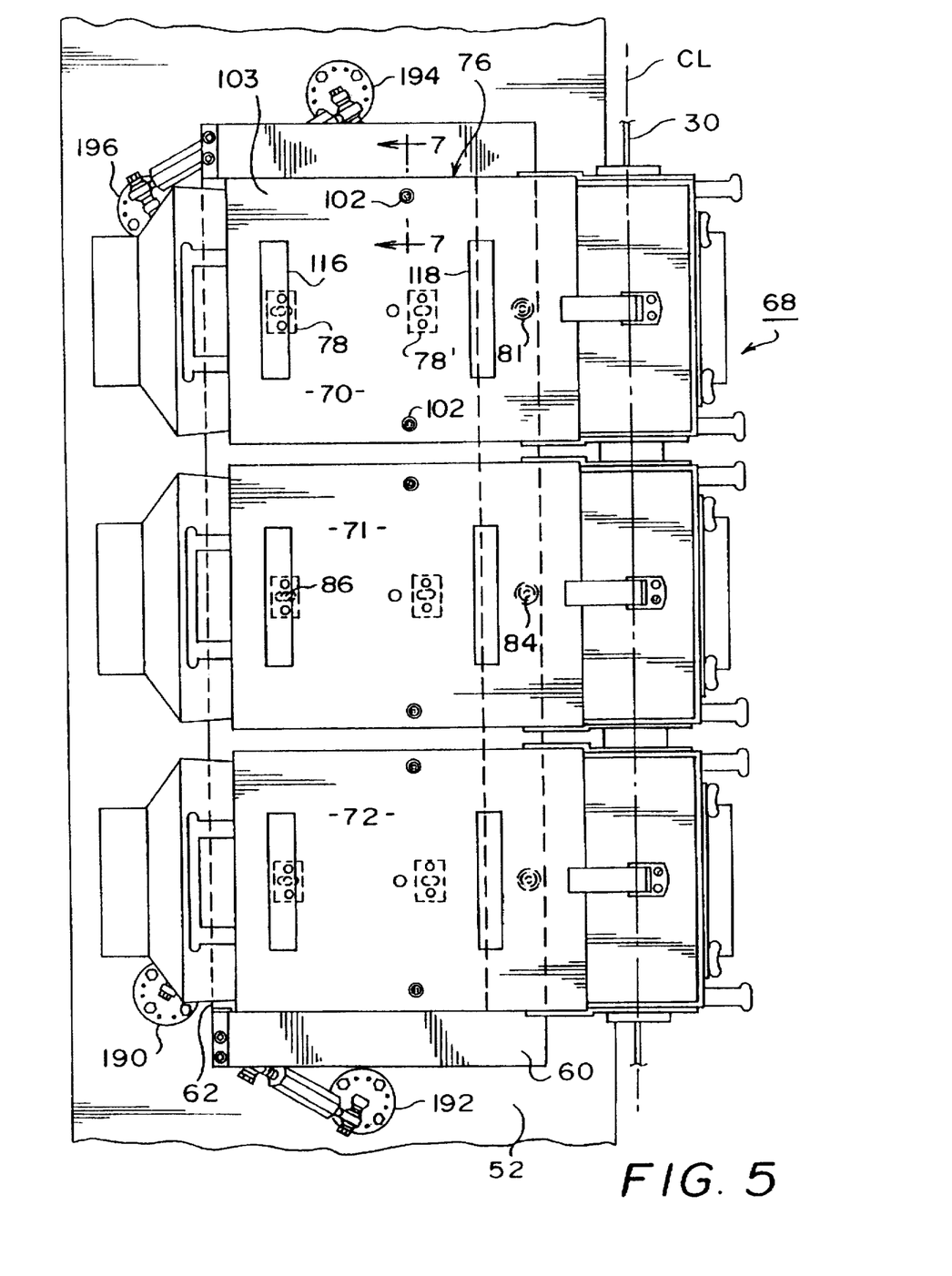
FIG. 5 is a front elevational view corresponding to FIG. 4.

Referring now to FIGS. 4 and 5 of the drawings, a support assembly 50 is shown rigidly secured to a base or foundation member 52, such as a building wall or other stationary load bearing structure, by means of three mounting assemblies 54, 56 and 58. The stationary base 52 may be permanently installed or temporarily fixed. Although the support assembly 50 may be comprised of a single mounting plate, it preferably includes an adjustable fixed frame 60 on which an articulated plate 62 is mounted for swinging movement by upper and lower hinges 64 and 66, respectively, as may be seen best in FIG. 8. Precisely located and fixed to the articulated plate 62 is an array 68 of three irradiating units 70, 71 and 72. The purpose of the swinging movement provided by plate 62 is to permit the array 68 to be readily moved between its operating position and a service position in which the irradiating tube 32 may be removed for cleaning or replacement, or in which other service may be performed on one or more components of the irradiating units.

The swinging movement of plate 62 may be done manually through an arc of preferably at least about 30°, more preferably in the range of about 30° to about 90°. A pair of manually operated fasteners 74, 74, which may be of the spring loaded lever type, is provided to secure swing plate 62 firmly in a fixed position closely adjacent to a fixed adjusted position of frame 60 so as to thereby hold the array 68 precisely in its operative position. Alternatively, plate 62 may be moved and fixed by a remotely operated system, such as actuated by pneumatic or hydraulic cylinders or by electric solenoids.

Figure 6:
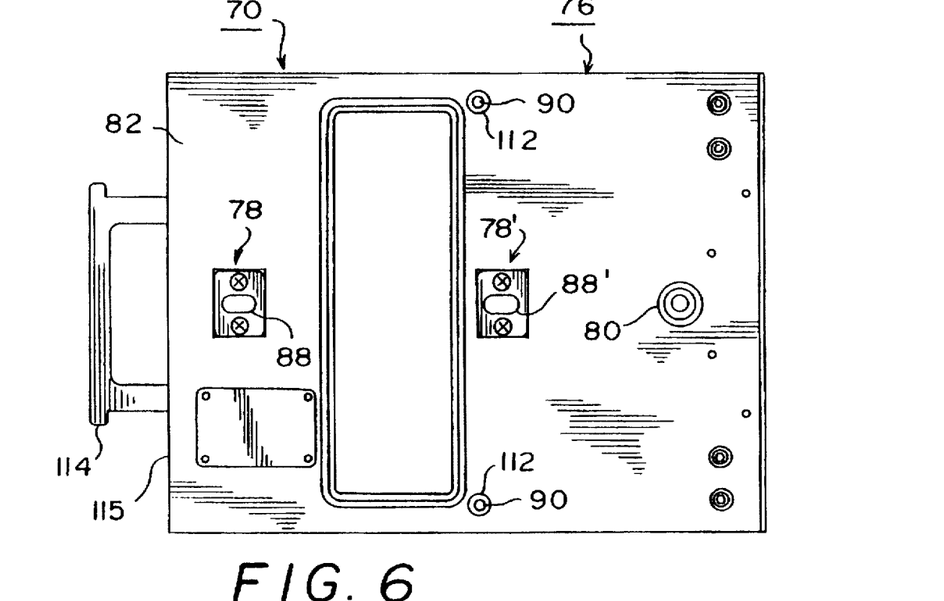
FIG. 6 is a rear view of a filament irradiating unit illustrating its rear mounting panel according to the invention.
Figure 7:
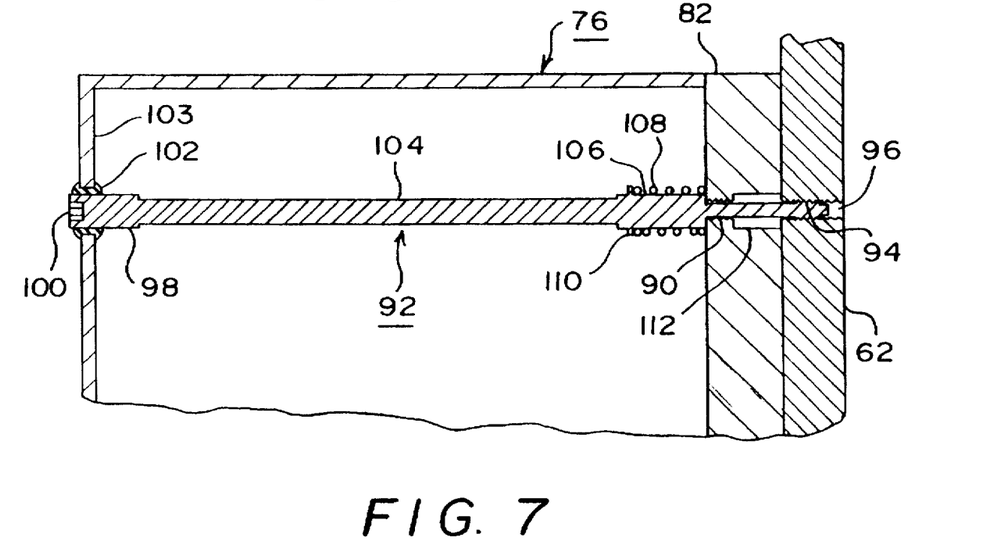
FIG. 7 is a partially sectioned side view of the irradiating unit of FIG. 6.

Referring now to FIGS. 5-7, there are shown the locating features of the irradiating unit housing 76 that are provided for precisely and reproducibly positioning each of the irradiating units 70, 71 and 72 on the articulated swing plate 62. Such precision in the positioning of housing 76 on the plate 62 is necessary to insure that the object focus within the irradiating tube 32 is returned to its precisely aligned position when an irradiating unit is returned to service after periodic maintenance.

Figure 8:
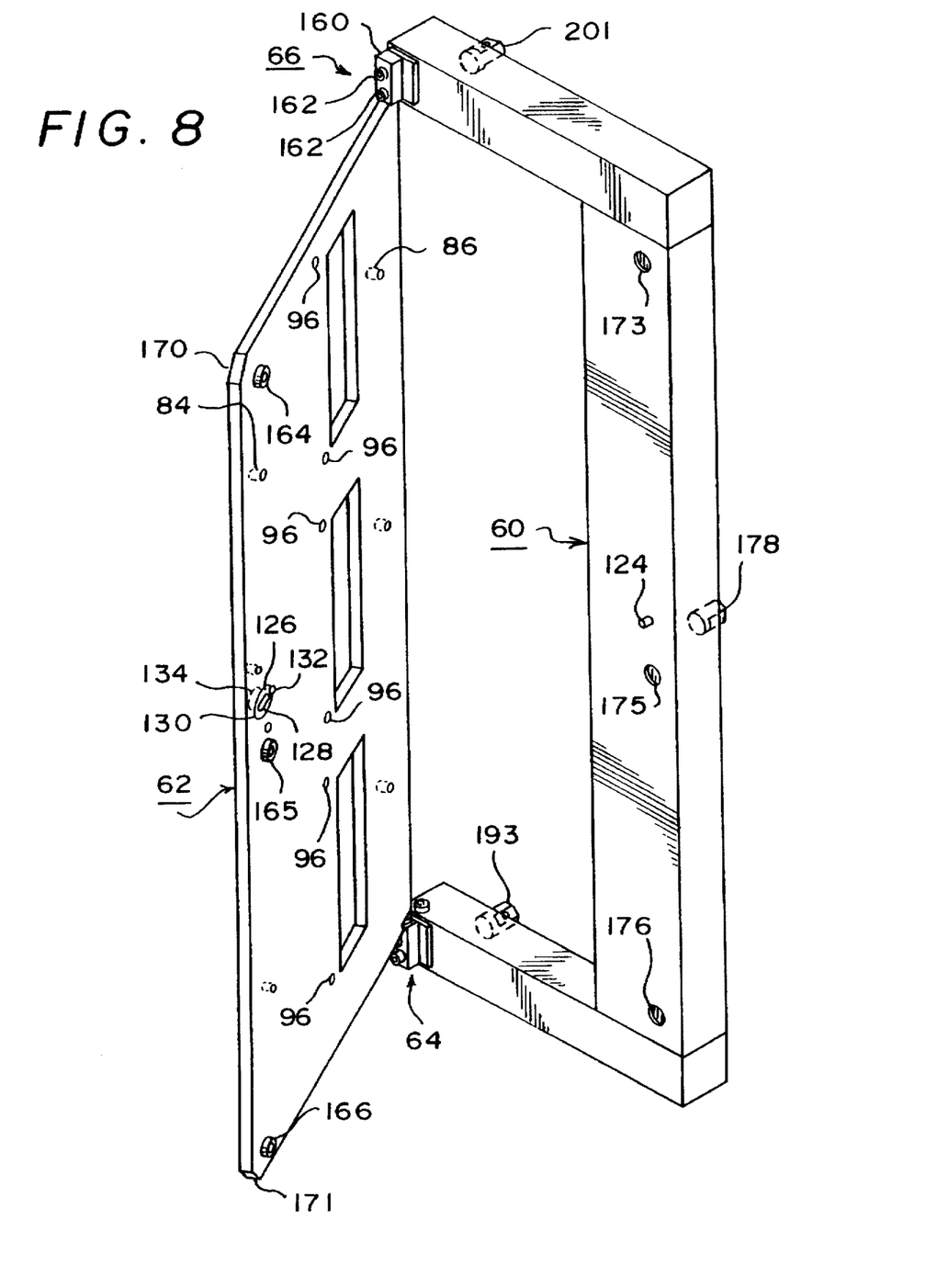
FIG. 8 is a perspective side view of a swing mounting plate as hinged and swung about 30° away from an adjustable mounting frame, all according to the invention.

The locating features include alignment bushings 78 and 80 mounted on and passing into or through a rigid mounting plate 82, which is precisely machined and forms the rear wall of the housing 76. Plate 82 is preferably relatively thick, such as 0.5 to 1.0 inches, and may be made from cast aluminum. As shown in FIG. 6 a bushing 78' may be provided in another position as an alternative to alignment bushing 78. Each of these bushings provide a precisely machined aperture 88 for receiving corresponding alignment pins 84 and 86, which are fixedly mounted on the front face of plate 62 as shown in FIG. 8. It is preferable to use only one of the bushings 78 and 78' to avoid binding problems that may occur if three alignment pins and corresponding apertures are used. In this regard, the bushing 80 is circular and the bushing 78 (or 78') preferably has an elongated alignment aperture 88 (or 88') to avoid binding due to slight variations in tolerances between the positioning of alignment pins 84 and 86.

The rigid back plate 82 of the housing 76 also contains a pair of mounting apertures 90, 90 for allowing passage of corresponding spring biased securing bolts 92 as may be seen best in FIG. 7. The rearward end of the securing bolts are threaded, as at 94, to mate with threaded apertures 96 in the swing plate 62 (FIG. 8).

The spring biased bolts 92 include a head 98, which preferably has an allen wrench socket 100 and a cylindrical outer surface for sealingly engaging an annular sealing gasket 102 around a corresponding hole in the front panel 103 of the housing. Gasket 102 prevents loss of cooling air that is passed through the housing 76 to prevent the overheating of the radiation generating components contained therein. The securing bolt 92 also includes an elongated shaft 104 connecting the head 98 to a cylindrical boss 106, which receives a coil spring 108 and has a spring compression ridge 110 for engaging the outer end of the spring.

When the bolt threads 94 are threaded through corresponding threads in the aperture 90 of rigid mounting plate 82, the inner end of spring 108 rests against the inner surface of the mounting plate with the threads 94 being fully retracted within a counterbore 112. This arrangement provides for axial reciprocation of the securing bolt 92 so that it may be retracted into counterbore 112 when not in use, and may be extended out of the counterbore and into engagement with one of the plate apertures 96 for the purpose of detachably securing each of the irradiating units to the swing plate 62. When the threads 94 are engaged in the aperture 96, the spring 108 is compressed to an extent sufficient for the rear end of boss 110 to rest against the inner surface of housing plate 82 as shown in FIG. 7.

A handle 114 is provided on a left hand panel 115 of housing 76 and a pair of handles 116 and 118 is provided on the front panel 103 of housing 76 to facilitate the handling of the irradiating unit during its installation on the swing plate 62 and during it subsequent removal and reinstallation for periodic service.

As shown in FIG. 8, the support assembly 50 also includes additional locating features to insure precise positioning of the irradiating units, and the object focus therein contained, relative to the operatively fixed but adjustable frame member 60 of the support assembly. These features include an alignment pin 124 on the adjustable frame 60, and an alignment bushing 126 on swing plate 62 that has a cooperating precision slot 128 for receiving the alignment pin 124. The bushing 126 is precisely located within a counterbore 130 on the rear side of the swing plate by a roll pin 132 for engaging a corresponding arc-shaped detent in the edge of the bushing. Roll pin 132 precisely orients the slot 128 so that the swing plate 62 is exactly aligned with the adjustable frame 60 when the alignment pin 124 is received in the slot 128. An aperture 134 extends between the counterbore 130 and the front face of the swing plate to permit easy removal of the bushing 126, which is preferably press fitted into the counterbore 130.

Figure 9:
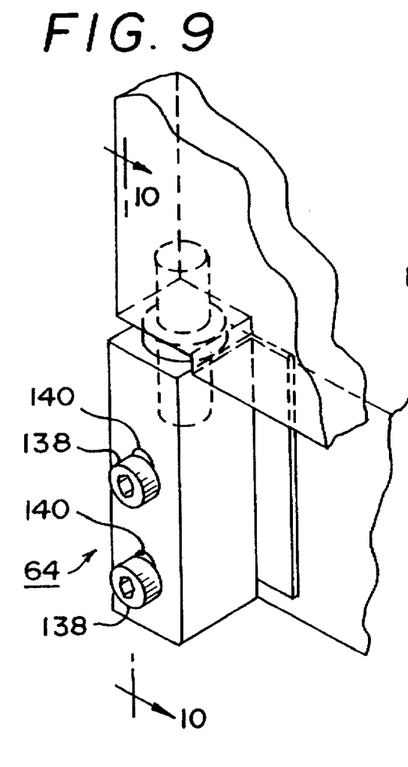
FIG. 9 is a perspective front view showing details of the lower hinge between the swing plate and the adjustable mounting frame of FIG. 8.
Figure 10:
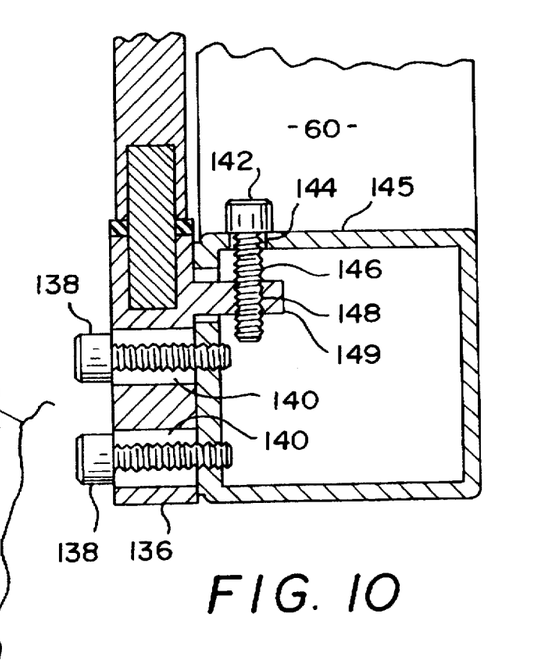
FIG. 10 is a fragmentary sectional view as taken along lines 10—10 of FIG. 9.

Another feature which insures the proper positioning of the swing plate 62 relative to the adjustable frame 60 is that the lower hinge 64 includes an assembly allowing slight changes in the positioning of the swing plate relative to the frame so as to prevent binding between the alignment pin 124 and the alignment aperture 128. This adjustment assembly is shown in FIGS. 9 and 10 and comprises a lower hinge plate 136 which is mounted on the frame 60 by a pair of bolts 138, 138 which pass through vertically elongated apertures 140, 140 in the hinge plate. The elongated shape of these apertures permits a vertical adjusting movement of the hinge plate 136 when the bolts 138, 138 are loosened. Such vertical adjustment is provided by a vertical adjustment bolt 142 which has a threaded shaft 146 passing through a bore 144 in the upper surface of a hollow tube 145, which forms the lower leg of the C-shaped adjustable frame 60. The threaded shaft 146 engages a threaded aperture 148 in an inwardly extending arm 149 fixed to the rear surface of the hinge plate 136 as shown in FIG. 10.

The vertical position of the swing plate 62 relative to frame 60 may therefore be adjusted by loosening the bolts 138, 138 and turning the adjustment bolt 142 until there is no binding between the alignment pin 124 and the alignment aperture 128. The bolts 138, 138 are then fully tightened to lock the hinge plate 136 in the precisely fixed position that prevents such binding. Such vertical adjustment of the swing plate 62 is facilitated by the upper hinge 66 which includes a hinge plate 160 which also has vertically elongated apertures (not shown) for receiving mounting bolts 162, 162 as may be seen in FIG. 8.

Figures 11, 14:
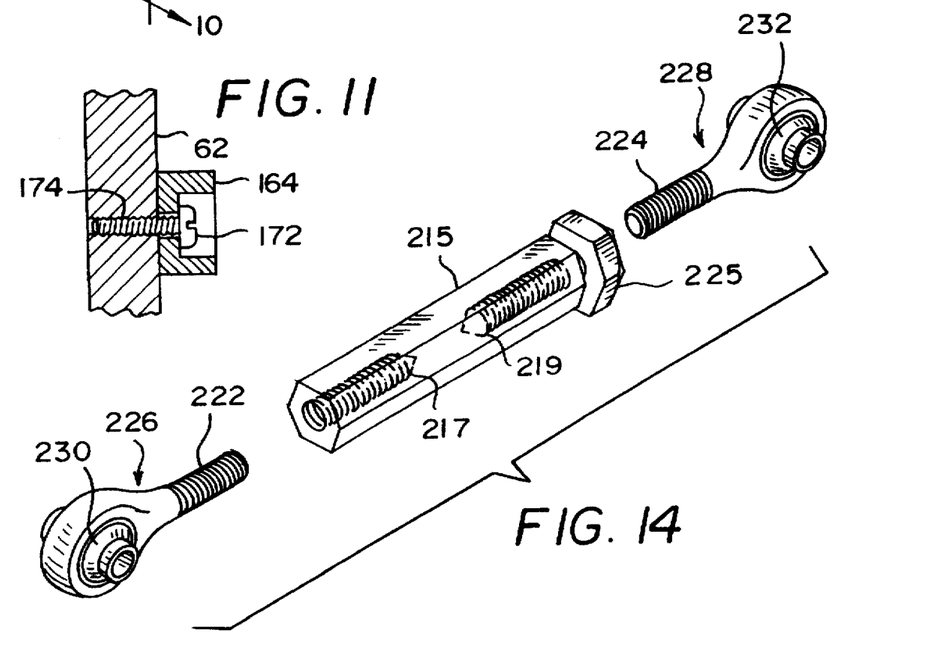
FIG. 11 is a fragmentary sectional view showing details of one of three metal bumpers mounted on the rear face of the swing plate.
FIG. 14 is an exploded view showing details of the torque tube and rod end bearings of one of the two torque tube components used in each of the three adjustable mounting assemblies according to the invention.

A further feature insuring proper alignment between the swing plate 62 and the frame 60 is the use of three precision machined steel bumpers 164, 165 and 166, two of which are mounted on the rear side of the swing plate near its freely movable corners 170 and 171, and one of which is mounted at an intermediate position near the alignment bushing 126 as shown in FIG. 8. In FIG. 11 are shown the details of mounting the bumper 164 which is secured in place by a screw 172 threadedly engaged in a threaded aperture 174 in the swing plate. The bumpers 164, 165 and 166 on the swing plate precisely engage corresponding precisely machined shallow indentations or spot faces 173, 175, and 176, respectively, on the front surface of the fixed frame 60 as also may be seen in FIG. 8.

Figure 12:
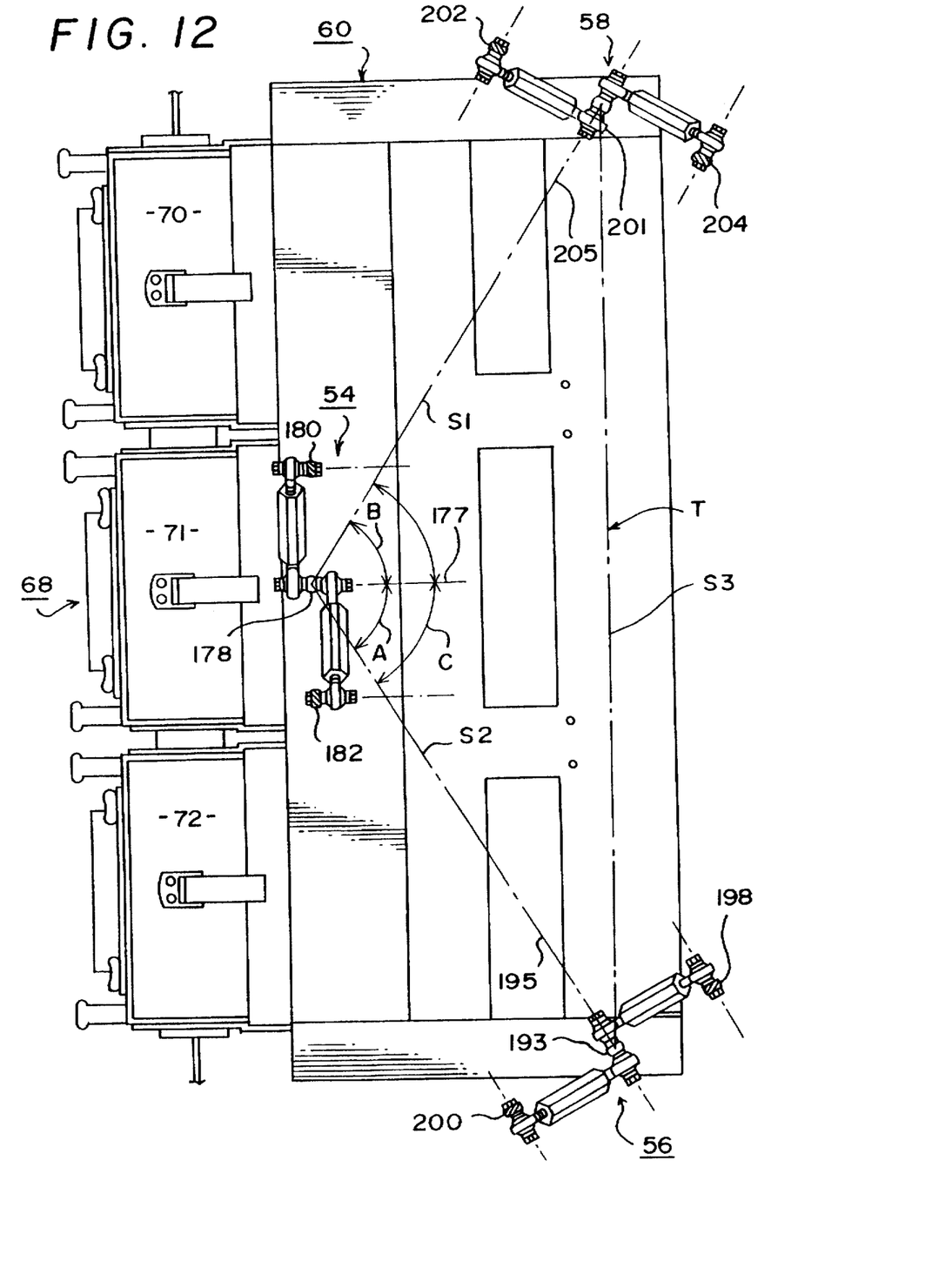
FIG. 12 is a sectional elevational view as taken along lines 12—12 of FIG. 4 and looking toward the adjustable mounting frame of the invention.
Figure 13:
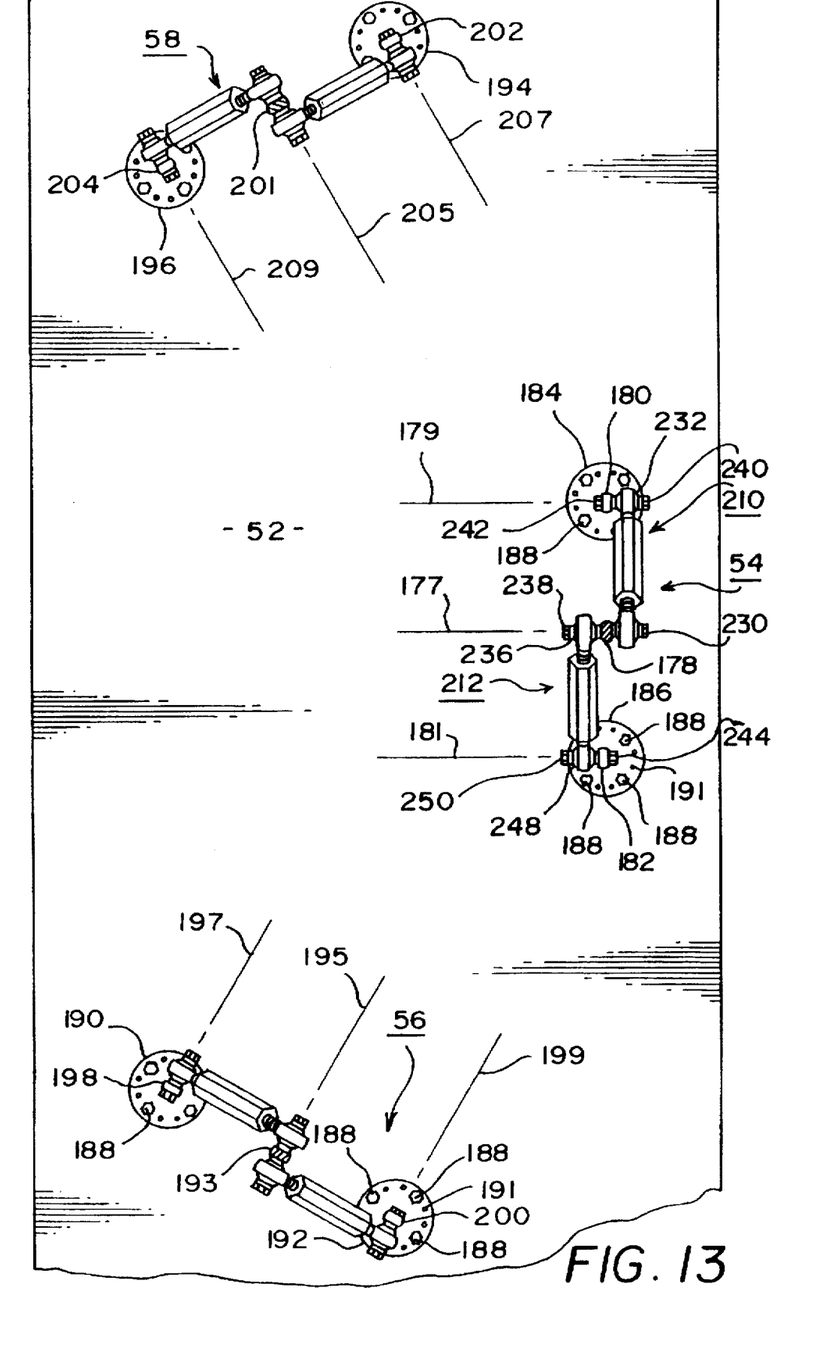
FIG. 13 is a sectional elevational view as taken along lines 13—13 of FIG. 4 and looking toward the surface of a mounting base or foundation.

As shown in FIGS. 4, 12 and 13, the mounting assembly 54 extends between frame mounted pin 178 and base mounted pins 180 and 182, mounting assembly 56 extends between frame mounted pin 193 and base mounted pins 198 and 200, and mounting assembly 58 extends between frame mounted pin 201 and base mounted pins 202 and 204. Frame pin 178 has a bolt hole with a central axis 177 aligned horizontally, frame pin 193 has a bolt hole with a central axis 195 aligned upward toward the right at 60° from the horizontal, and frame pin 201 has a bolt hole with a central axis 205 aligned downward toward the right at an angle of 60° to the horizontal, as viewed from the front in FIG. 13.

There will now be described the manner in which the adjustable frame 60 is adjustable mounted on the stationary base 52 by means of the three mounting assemblies 54, 56 and 58. Since these three mounting assemblies are identical, the individual components of only one of these assemblies, namely assembly 54, will be described in detail. The mounting assembly 54 comprises the sole mounting pin 178 rigidly secured, as by welding, to the rear face of the frame 60, and a pair of mounting pins 180 and 182 having corresponding mounting feet 184 and 186, respectively, for detachably securing the respective mounting pins of this pair to the stationary base 52.

As may be seen best in FIG. 13, four bolts 188 are used to detachably secure each mounting foot to the stationary base 52. However, each mounting foot preferably has more than four bolt apertures 191 so as to provide for different orientations of the mounting pins 180 and 182 for the purpose described further below. More preferably, there are twelve apertures 191 spaced around the perimeter of each of the feet 180 and 182 so that the axis of a bolt hole passing transversely through the distal end of the corresponding mounting pin may be positioned at a variety of orientations, each orientation differing from the adjacent orientation by 30°.

Although different orientations may be employed, there is shown in FIG. 13 a preferred arrangement of the mounting feet 184 and 186 of the mounting assembly 54, of the mounting feet 190 and 192 of mounting assembly 56, and of the mounting feet 194 and 196 of mounting assembly 58. In assembly 54, a hole axis 177 of pin 178 and the respective hole axes 179 and 181 of pins 180 and 182 are oriented horizontally, and may be considered as being reference axes. The hole axis 195 of pin 193 and the respective hole axes 197 and 199 of the pins 198 and 200 of assembly 56 are oriented at 60° from the horizontal as extended upward toward the right of FIG. 13, and the hole axis 205 of pin 201 and the respective hole axes 207 and 209 of mounting pins 202 and 204 of mounting assembly 58 are oriented 60° from the horizontal as extended downwardly toward the right of FIG. 13.

It is not required that the reference hole axes of pins 178, 180 and 182 extend horizontally. However, it is preferred that the hole axes of the mounting pins for the mounting assemblies 56 and 58 be positioned at predetermined angles relative to the reference axes, and that the hole axes of mounting assembly 56 be at a different angle relative to the reference axes than the hole axes of mounting assembly 58. This arrangement is preferred because the resulting three contact points of attachment of these assemblies to the frame 60 form an imaginary triangle T that may have two equal sides S1 and S2 connected by a base S3 of equal or different length, as shown in FIG. 12. This produces a particularly rigid structure for insuring that the support assembly 50 is maintained in a precisely fixed position during operation of the irradiating units.

Thus, the angles of the hole axes of the assemblies 56 and 58 may be defined generically relative to the reference hole axes of assembly 54 by reference to each hole axis of the respective sole mounting pins mounted on the rear face of adjustable frame 60 as shown in FIG. 12. On this basis, the angles A and B between the reference hole axis 177 of pin 178 and the respective axes 195 and 205 of pins 193 and 201 are preferably in the range of about 45° to about 75°, more preferably about 60°. Since the hole axis 195 extends upwardly toward the left of FIG. 12 and the hole axis 205 extends downwardly toward the right of FIG. 12, the corresponding angle C between the hole axes 195 and 205 of the sole mounting pins 193 and 201 is preferably in the range of about 105° to about 135°, preferably about 120°.

As the mounting assemblies are identical, only the mounting assembly 54 is described in more detail below. As shown in FIG. 4, mounting assembly 54 comprises a pair of torque linkages 210 and 212, torque linkage 210 extending between frame pin 178 and base pin 180, and torque linkage 212 extending between frame pin 178 and base pin 182. Each of the torque linkages 210 and 212 comprise a torque tube 215 having threaded bores 217 and 219 extending inward from opposite ends of the torque tube as shown in FIG. 14. The threaded bores 217 and 219 receive the threaded distal ends 222 and 224 of respective bearing rods 226 and 228. The threads 222 and 224 are of opposite hand such that rotation of the torque tube 215 in one direction draws the threaded ends together, while rotation of the torque tube in the opposite direction pushes the threaded ends apart.

After rotation of torque 215 for relative movement of the rod ends, the respective rod ends may then be locked in a fixed position relative to each other by tightening a locking nut 225 on the threads 224 so that it securely engages the rear end of torque tube 215 as shown in FIG. 4. Locking nut 225 would serve the same function if it was in threaded engagement with the threads 222 and the front end of torque tube 215. As an alternative, two locking nuts could be used, one on threads 222 and the other on threads 224.

At the opposite ends of bearing rods 226 and 228 are respective spherical bearings 230 and 232 that permit rotation and tilting of all of the linkages 210 and 212 with all degrees of freedom as they are adjusted to move frame 60 relative to the stationary base 52. The respective spherical bearings have bolt holes corresponding to the bolt holes in the respective mounting pins. Thus, referring to mounting assembly 54 as shown in FIG. 13, a threaded bolt 234 passes through the bolt hole of bearing 230, through the bole hole in pin 178 and through the bolt hole in a spherical bearing 236 at the frame end of torque tube linkage 212. The bolt 334 is tightly secured in its respective holes by a threaded nut 238.

Similarly, a securing bolt 240 passes through a bolt hole in spherical bearing 232 at the base end of linkage 210 and through bolt hole in base pin 180 of mounting foot 184, and is tightly secured in its respective bolt holes by a nut 242. Also, a securing bolt 244 passes through a bolt hole in base pin 182 of mounting foot 186 and through a bolt hole in a spherical bearing 248 at the base end of linkage 212, and is tightly secured in its respective bolt holes by a nut 250.

The above described structure is duplicated for mounting assemblies 56 and 58, and therefore is not described in detail although the same numerals may be used to designate the same parts. As will be apparent from this structure, each of the frame pins 178, 193 and 203 are readily adjustable in any three-dimensional direction by rotating the corresponding pair of torque tube 215, 215 relative to the threaded ends 222 and 224 of the corresponding bearing rods. It follows that three different points of contact on the adjustable frame 60 may be moved in any direction so that the frame and all components mounted thereon will move with simultaneous movement vectors along one or more of the three dimensional axes X, Y and Z, and that any of these axes may be tilted as represented by the tilting of axis Z as shown in FIG. 3. Once frame 60 is adjusted into the position that brings the central axis of irradiating tube 32 into alignment with the directional axis CL corresponding to the centerline of the continuous filament 30, the position of frame 60 is fixed by tightening all of the locking nuts 225 along all of the threads 224 and securely against the base end of all of the torque tubes 215.

While the invention has been described in the form of specific embodiments, many alternatives, modifications, and variations will be apparent to those skilled in the art when they learn of this invention. For example, although the preferred embodiment of the invention has been described in terms of specific locations for the frame mounting pins and the base mounting pins, these pins may be located at other locations, provided that these locations produce a rigid mounting structure when the locking nuts 225 are securely tightened against their corresponding torque tubes. Accordingly, the preferred embodiment of the invention as set forth herein is intended to be illustrative and not limiting, the scope of the invention being defined only by the claims set forth below.

What is claimed is:

1. An apparatus for aligning with a directional axis an elongated object focus of an elliptical reflector, said apparatus comprising:

support means for mounting said reflector in a precisely fixed position on a support assembly; and, mounting means for mounting said support assembly on a stationary base for both lateral and tilting movements relative to said stationary base such that said object focus can be tilted and moved laterally into coincidence with said directional axis from multiple directions, and for fixing the position of the movable support assembly when said object focus coincides with said directional axis;

said mounting means comprising three mounting assemblies connected to said support assembly at three spaced apart locations, each of said locations corresponding to one of said mounting assemblies and being at the apex of an imaginary triangle, each of said mounting assemblies comprising three mounting pins, a pair of which is fixed to one of said support assembly and said base and a sole one of which is fixed to the other of said support assembly and said base, and each pin of said pair of mounting pins being connected to said sole mounting pin by a corresponding one of a pair of linkages each of adjustable length and having at opposite ends a pivot joint between said linkage end and a corresponding mounting pin, said pair of linkages forming two sides of a triangle with its apex at said sole mounting pin.

2. The apparatus according to claim 1 wherein said support assembly comprises a frame carrying the mounting pins at one end of said linkages, a plate articulated to said frame by hinge means for swinging movement of said plate relative to said frame, and fastening means for releasably fastening said articulated plate to said frame to selectively prevent said swinging movement.

3. The apparatus of claim 2 wherein said support assembly further comprises at least one alignment pin on one of said plate and said frame and an alignment aperture on the other of said plate and said frame, and wherein said hinge means comprises an adjustment means for changing the position of said plate relative to the position of said frame to avoid binding between said alignment pin and said alignment aperture.

4. The apparatus of claim 2 wherein said hinge means spaces one edge of said plate at a precise distance from said frame, and wherein said support assembly further comprises bumper members for spacing an opposite edge of said plate from said frame by said precise distance.

5. The apparatus of claim 1 wherein each of said linkages comprises a pair of rods having threads at one end and a spherical bearing at the other end connected to said corresponding mounting pin, and a torque tube having a threaded passage at each end for receiving a corresponding one of said threaded rod ends, the respective threads of said threaded rod ends being of opposite hand such that rotation of said torque tube changes the length of said linkage.

6. The apparatus of claim 1 wherein said object focus is substantially at the central axis of an irradiating tube of an irradiating unit having a radiation source at a source focus of said elliptical reflector.

7. The apparatus of claim 6 wherein said irradiating tube and said elliptical reflector are rigidly mounted relative to a rigid plate having a first pair of locating members for engaging a second pair of locating members on said support assembly, said irradiating tube and said elliptical reflector being positioned precisely with reference to said first pair of locating members.

8. The apparatus of claim 1 wherein each of said pairs of mounting pins is fixed to said base and each of said sole mounting pins is fixed to said support assembly.

9. The apparatus of claim 1 wherein the pivot joint between the corresponding linkage end and the sole mounting pin of each of said mounting assemblies comprises a fastener having a shank passing along an axis of a hole in the mounting pin, and wherein the hole axes of the sole mounting pins are positioned at different angles relative to the horizontal and to each other.

10. The apparatus of claim 9 wherein one of said sole mounting pins is a reference pin the hole of which defines a reference axis, and wherein the hole axis of each of the other two sole mounting pins is at an angle relative to said reference axis.

11. The apparatus of claim 10 wherein said angle relative to said reference axis is in the range of about 45° to about 75°.

12. The apparatus of claim 11 wherein the hole axes of said other two sole mounting pins form an angle relative to each other in the range of about 105° to about 135°.

13. The apparatus of claim 10 wherein said angle relative to said reference axis is about 60°.

14. The apparatus of claim 13 wherein the hole axes of said other two sole mounting pins form an angle relative to each other of about 120°.

15. The apparatus of claim 10 wherein said reference axis is substantially horizontal.

16. The apparatus of claim 15 wherein said angle relative to said reference axis is in the range of about 45° to about 75°.

17. The apparatus of claim 16 wherein the hole axes of said other two sole mounting pins form an angle relative to each other in the range of about 105° to about 135°.

18. The apparatus of claim 15 wherein said angle relative to said reference axis is about 60°.

19. The apparatus of claim 18 wherein the hole axes of said other two sole mounting pins form an angle relative to each other of about 120°.

20. The apparatus of claim 1 wherein said directional axis is defined by the centerline of a vertically oriented and coated optical fiber.

* * * * *